US009352971B2

(12) United States Patent
Breneman

(10) Patent No.: US 9,352,971 B2
(45) Date of Patent: May 31, 2016

(54) METHOD AND APPARATUS FOR PRODUCTION OF SILANE AND HYDROHALOSILANES

(71) Applicant: REC Silicon Inc, Moses Lake, WA (US)

(72) Inventor: William C. Breneman, Moses Lake, WA (US)

(73) Assignee: REC Silicon Inc, Moses Lake, WA (US)

( * ) Notice: Subject to any disclaimer, the term of this patent is extended or adjusted under 35 U.S.C. 154(b) by 551 days.

(21) Appl. No.: 13/918,609

(22) Filed: Jun. 14, 2013

(65) Prior Publication Data

US 2014/0369918 A1 Dec. 18, 2014

(51) Int. Cl.
| | | |
|---|---|---|
| C01B 33/00 | (2006.01) | |
| C01B 33/04 | (2006.01) | |
| C01B 33/08 | (2006.01) | |
| C01B 33/10 | (2006.01) | |
| C01B 33/107 | (2006.01) | |
| B01D 3/00 | (2006.01) | |
| B01J 8/00 | (2006.01) | |
| B01J 8/02 | (2006.01) | |
| B01J 8/04 | (2006.01) | |
| B01J 19/00 | (2006.01) | |
| B01J 19/24 | (2006.01) | |

(52) U.S. Cl.
CPC .............. *C01B 33/043* (2013.01); *B01D 3/009* (2013.01); *C01B 33/107* (2013.01); *C01B 33/1071* (2013.01)

(58) Field of Classification Search
CPC ............ B01D 3/00; B01D 3/009; B01J 8/00; B01J 8/02; B01J 8/04; B01J 19/00; B01J 19/24; C01B 33/00; C01B 33/04; C01B 33/043; C01B 33/08; C01B 33/10; C01B 33/107–33/10763
See application file for complete search history.

(56) References Cited

U.S. PATENT DOCUMENTS

| | | | |
|---|---|---|---|
| 3,968,399 A | 7/1976 | Jarrett | |
| 4,610,858 A * | 9/1986 | Yamada | .................. B01D 3/322 423/342 |
| 4,676,967 A | 6/1987 | Breneman | |
| 4,713,230 A | 12/1987 | Doornbos | |
| 5,026,533 A | 6/1991 | Matthes et al. | |
| 6,843,972 B2 | 1/2005 | Klein et al. | |
| 6,852,301 B2 | 2/2005 | Block et al. | |
| 6,887,448 B2 | 5/2005 | Block et al. | |
| 6,905,576 B1 | 6/2005 | Block et al. | |
| 6,942,844 B2 | 9/2005 | Müller et al. | |
| 7,605,283 B2 | 10/2009 | Geisberger et al. | |
| 2004/0030171 A1 | 2/2004 | Klein et al. | |
| 2008/0095691 A1 | 4/2008 | Sonnenschein et al. | |
| 2010/0150809 A1 | 6/2010 | Bill, Jr. et al. | |
| 2011/0150739 A1 | 6/2011 | Seliger et al. | |
| 2013/0156675 A1 | 6/2013 | Breneman | |

FOREIGN PATENT DOCUMENTS

| | | |
|---|---|---|
| DE | 1005752 | 4/1957 |
| DE | 19860146 | 6/2000 |
| EP | 0829484 | 3/1998 |
| EP | 2179965 A1 | 4/2010 |
| KR | 10-2008-0112138 A | 12/2008 |
| KR | 10-2011-0031284 A | 3/2011 |
| WO | WO 2012/013123 | 2/2012 |
| WO | WO 2013/090726 | 6/2013 |

* cited by examiner

*Primary Examiner* — Natasha Young
(74) *Attorney, Agent, or Firm* — Klarquist Sparkman, LLP

(57) ABSTRACT

Silane and hydrohalosilanes of the general formula $H_ySiX_{4-y}$ (y=1, 2, or 3) are produced by reactive distillation in a system that includes a fixed-bed catalytic redistribution reactor that can be back-flushed during operation.

14 Claims, 3 Drawing Sheets

METHOD AND APPARATUS FOR PRODUCTION OF SILANE AND HYDROHALOSILANES

FIELD

The present disclosure concerns embodiments of a system and method for producing silane and hydrohalosilanes of the general formula $H_ySiX_{4-y}$ (y=1, 2, or 3), having a fixed-bed catalytic redistribution reactor.

BACKGROUND

Mono-silane ($SiH_4$), chlorosilane ($H_3SiCl$) and dichlorosilane ($H_2SiCl_2$) are useful chemicals for the production of electronic devices based on high purity crystalline silicon. These silicon bearing gases are thermally decomposed to form the high purity silicon material. The production of high purity silane is presently practiced on a commercial scale by a process shown generally in FIG. 1 and generally described by U.S. Pat. No. 4,676,967 wherein, in Zone 1, metallurgical grade silicon (101) is gasified by the reaction of hydrogen and silicon tetrachloride to form a mixture (102) containing volatile trichlorosilane:

$$2H_2 + 3SiCl_4 + Si \rightarrow 4HSiCl_3 \qquad (1)$$

Impurities (103) are rejected.

Then, in Zone 2, trichlorosilane is converted to the high purity silane product (201) in a series of distillation separations and catalytic redistribution reactions which also produce silicon tetrachloride (202) as a co-product. Impurities (203) are rejected. The silicon tetrachloride (202) is recycled to Zone 1.

$$4HSiCl_3 \rightarrow 3SiCl_4 + SiH_4 \qquad (2)$$

The silane (201) is then pyrolyzed in any of several ways in Zone 3 to form ultra-pure silicon (301) and, if the process is close coupled, the by-product hydrogen (302) is recycled to Zone 1.

SUMMARY

Described herein are embodiments of a system and process that combine fractional distillation separation of hydrohalosilanes and catalytic redistribution of hydrohalosilanes in a novel configuration that facilitates back-washing of a catalytic redistribution reactor during system operation. When a catalytic redistribution reactor includes a fixed-bed catalyst having particles of differing sizes, such as a commercial ion-exchange resin, over time the smaller particles migrate downward in the catalyst bed and create a greater pressure drop through the catalytic redistribution reactor. As a result, the catalytic redistribution reactor is occasionally back-washed to reconfigure the catalyst bed and restore adequate flow.

Embodiments of the system include a multi-zone fractional distillation column, a first catalytic redistribution reactor, a second catalytic redistribution reactor, and a pump. The multi-zone fractional distillation column includes a vessel defining a plurality of distillation zones, a reactant stream inlet positioned in a lower portion of the column, a distillate stream outlet positioned in an upper portion of the column, and a product stream inlet positioned in a lower portion of the column. Each of the first and second catalytic redistribution reactors includes a vessel defining a chamber, a first port positioned in a lower portion of the vessel, and a second port positioned in an upper portion of the vessel, a fixed-bed catalyst (e.g., an ion-exchange resin) disposed within the vessel, and a plurality of valves, typically four valves. The valves can be configured such that (i) the first (lower) port is in fluid communication with the product stream inlet and the second (upper) port is in fluid communication with the distillate stream outlet or (ii) the first port is in fluid communication with the distillate stream outlet and the second port is in fluid communication with the product stream inlet, thereby enabling fluid to flow in a desired direction through the catalytic redistribution reactor. The pump is positioned downstream from the distillate stream outlet and upstream from the first catalytic redistribution reactor and the second catalytic redistribution reactor. The system optionally includes a cooling device positioned downstream of the distillate stream outlet.

A reactant stream including one or more hydrohalosilanes of formula $H_ySiX_{4-y}$ where X is a halogen and y is 1, 2, or 3 is passed into the multi-zone fractional distillation column through the reactant stream inlet. Distillate is pumped from the multi-zone fractional distillation column via the distillate stream outlet positioned in an upper portion of the column through the first and second catalytic redistribution reactors. The distillate may be cooled before it enters the pump. In some embodiments, the valves of the first catalytic redistribution reactor are configured to route a first portion of the distillate into the first reactor via the first reactor's upper port, and to route a product stream out of the first reactor via its lower port (i.e., "normal-flow mode"). The valves of the second catalytic redistribution reactor are configured to route a second portion of the distillate into the second reactor via the second reactor's lower port, and to route a product stream out of the second reactor via its upper port (i.e., "back-flow mode"), thereby back-flushing the second reactor. The product stream from both reactors flows into the multi-zone fractional distillation column via the product stream inlet positioned in a lower portion of the column.

Advantageously, the valves are configured to provide a greater flow rate of the distillate when the catalytic redistribution reactor is operating in normal-flow mode than when it is operating in back-flow mode. In other words, a flow rate into a catalytic redistribution reactor via its upper port in normal-flow mode is greater than a flow rate into the catalytic redistribution reactor via its lower port in back-flow mode. For example, the flow rate in normal-flow mode may be at least 9-fold greater than the flow rate in back-flow mode.

In some embodiments, the method further includes monitoring a pressure drop within the first catalytic redistribution reactor, determining whether the pressure drop exceeds a threshold value, and reversing a direction of flow through the first catalytic redistribution reactor and the second catalytic redistribution reactor when the pressure drop exceeds the threshold value. Flow reversal is achieved by opening and closing the appropriate valves to re-route the distillate and product stream flows through the first and second catalytic redistribution reactors such that the first reactor operates in back-flow mode and the second reactor operates in normal-flow mode.

The pressure drop within the second catalytic redistribution reactor then is monitored to determine whether it exceeds the threshold value. When the threshold is exceeded, the flow direction is once again reversed by opening and closing the appropriate valves so that the second catalytic redistribution reactor operates in back-flow mode and the first catalytic redistribution reactor again operates in normal-mode.

DETAILED DESCRIPTION

Figure 1:
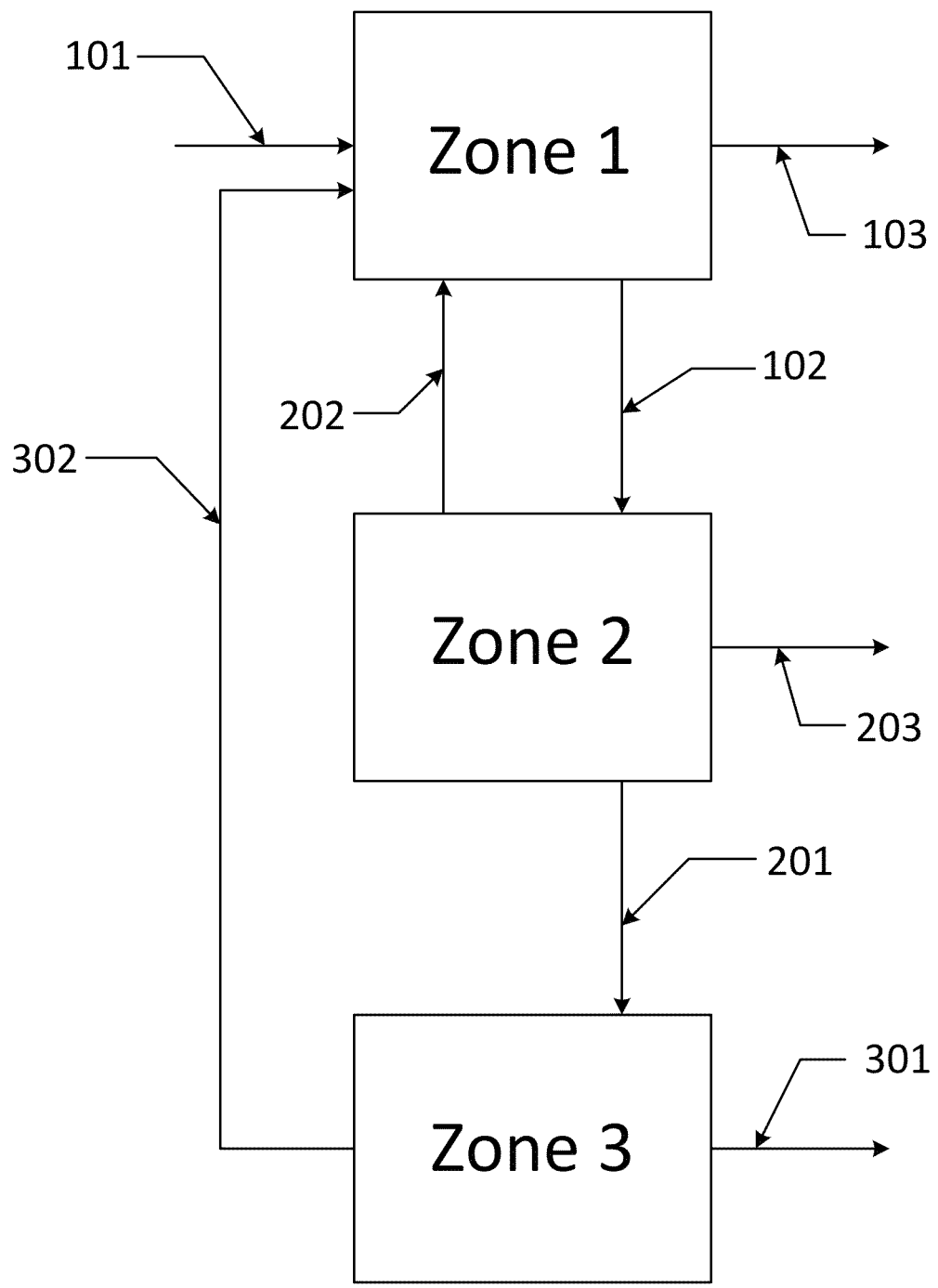
FIG. 1 is a block diagram of a presently practiced process for the production of silane and thereafter pure silicon on a commercial scale.

This disclosure pertains to that portion of the overall process for production of silane from metallurgical grade silicon and hydrogen wherein a mixture of hydrohalosilanes of formula $H_ySiX_{4-y}$, where X is a halogen and y is 1, 2, or 3 are converted into silane and silicon tetrahalide. For example, trichlorosilane and silicon tetrachloride resulting from a gasification process, reaction (1), may be converted into silane and silicon tetrachloride, reaction (2). Intermediate products including dihalosilane ($H_2SiX_2$) and halosilane ($H_3SiX$) also can be isolated at various points in the process.

In the production of hydrochlorosilanes, an integrated distillative separation of the component hydrohalosilanes may be combined with catalytic redistribution of the compounds utilizing a solid supported catalyst. However, solid catalysts suitable for catalytic redistribution (e.g., ion-exchange resins) typically include particles of multiple sizes. As a fluid flows through the catalyst bed, smaller catalyst particles gradually migrate down through the catalyst bed and accumulate in the lower portion of the bed, and the pressure drop through the catalyst bed gradually increases over time. As a result, systems which rely upon gravity to drive fluid flow through the bed of catalyst will soon fail.

Placing the catalyst bed inside the distillation column provides additional challenges. There is not only the challenge posed by the vastly different kinetic rates of vapor-liquid equilibria and the chemical conversion, but there is also presented the challenge of how to arrange for fluid flow through the bed of solid catalyst particles in light of the limited pressure differential available in the distillation column. The latter challenge can be partially resolved by placing the catalyst bed outside the distillation column and located such that the liquid head available made possible by drawing a feed stream from the upper part of the column and letting it return to the column at a much lower elevation provides the necessary driving force to flow the fluid through the catalyst bed, even though the pressure at the location where the flow returns to the distillation column is higher than the pressure at the upper, withdrawal point.

Thus, an arrangement of multi-zone fractional distillation columns combined with fixed-bed catalytic redistribution reactors may be used. By selecting the system operating pressure, and hence the fractionation column temperature profile, the combined distillation and reaction operation can be conducted in a stable and predictable fashion using ambient air or commonly available cooling water for the condenser duty.

Nonetheless, commercially available ion-exchange resins have a broad particle size distribution. Migration of the smaller particles leads, over time, to increased pressure drop across the catalyst bed in the redistribution reactor. The catalyst beds also act as large filters to trap traces of solids, including silica, that can form from traces of oxygen or moisture present in industrial processes. Trapped silica solids attract boron and other metallic species by chemisorption (see, e.g., U.S. Pat. No. 4,713,230). The catalytic redistribution reaction, combined with the chemisorption and physical filtration action of the catalyst bed, prevents electronically active impurities from passing into the silane purification system. However, these trapped small particles also contribute to the pressure drop. At some point, the pressure drop becomes excessive, and the catalyst bed must be reconfigured to restore adequate flow. This can be accomplished by reversing the fluid flow to fluidize the beds, and allowing the beds to re-arrange to restore the original performance. Additionally, this back-wash procedure flushes out any trapped small particles that entered the process by trace means. The trapped particles re-enter the distillation column and are subsequently removed, e.g., through a bottom outlet of the distillation column.

Figure 2:
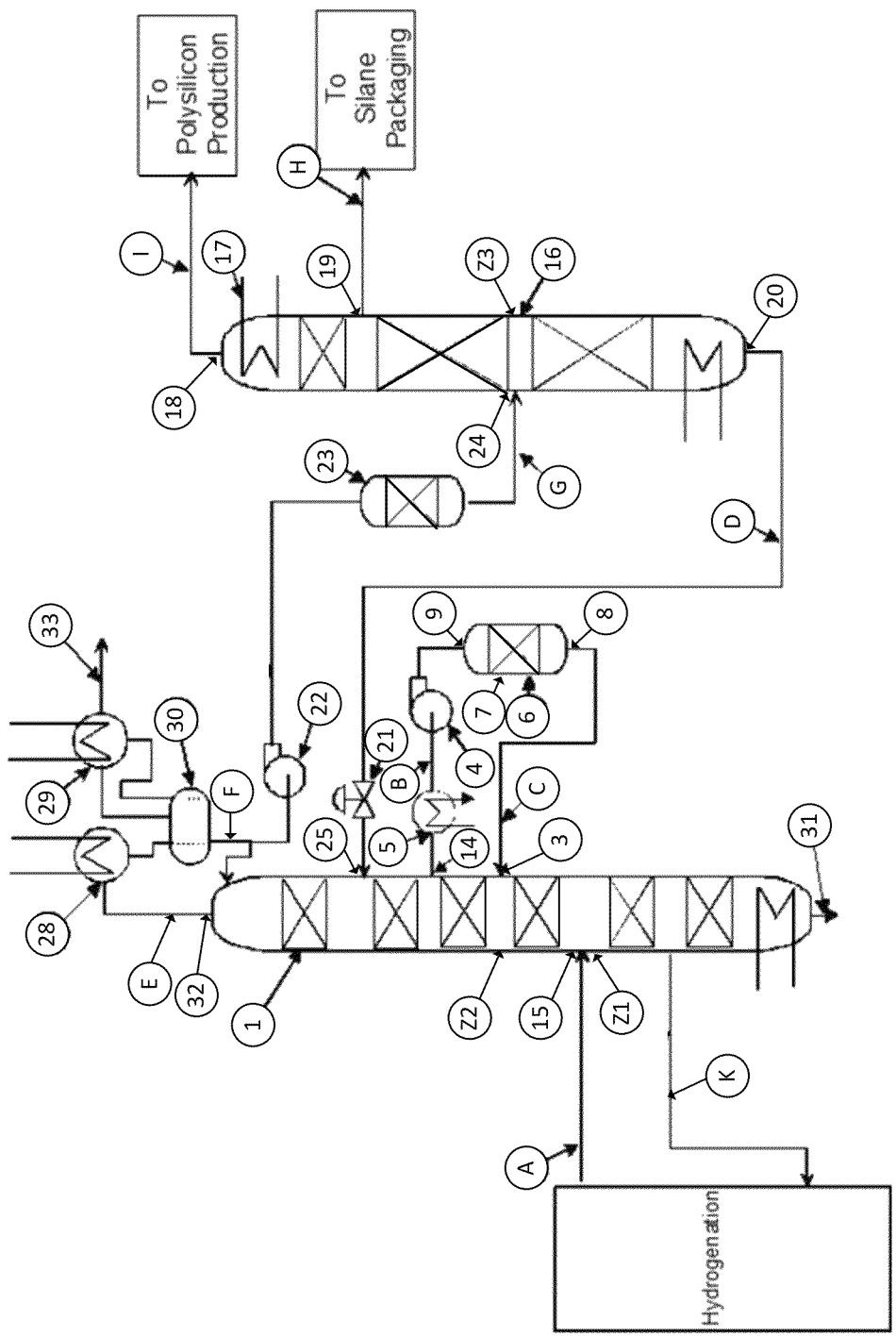
FIG. 2 is a schematic diagram of a system suitable for the production of silane.

In some embodiments, a grade of silane suitable for solar-grade silicon production is produced by a process and system illustrated by FIG. 2. A reactive distillation zone is provided by a multi-zone fractionation column (1). The first multi-zone fractional distillation column (1) includes a vessel defining a plurality of distillation zones including a first distillation zone (Z1) and a second distillation zone (Z2), a reactant stream inlet (15), a first distillate stream outlet (14), a first product inflow inlet (3), a bottom outlet (31), and a vapor outlet (32). Column (1) further includes a total condenser (28). In some arrangements, column (1) has two condensers (28, 29) in series as shown in FIG. 2, with hydrogen and/or nitrogen being vented at outlet (33). Condenser (29) removes remaining trace amounts of halosilanes before venting hydrogen/nitrogen. A collection tank/condensate receiver (30) is fluidly connected to condenser (28) and/or condenser (29). Condensate receiver (30) collects trace amounts of condensed halosilanes not removed in other fluid/vapor streams.

A reactant stream (A) comprising one or more hydrohalosilanes of formula $H_ySiX_{4-y}$, where X is a halogen and y is 1, 2, or 3 (e.g., from Zone 1 (FIG. 1), whether produced by the hydrogenation of $SiX_4$ or produced by the hydrohalogenation reaction, enters the first multi-zone distillation column (1) at a reactant stream inlet (15). In some embodiments, reactant stream (A) comprises a mixture of $HSiX_3$ and $SiX_4$. In certain examples, reactant stream (A) comprises a mixture of $HSiCl_3$ and $SiCl_4$. Reactant stream (A) may have a halogen to silicon molar ratio greater than 2.8, such as 2.8 to 3.9, 3.1 to 3.9, 3.5 to 3.8, or 3.6 to 3.8. Reactant stream (A) may be a liquid, a vapor, or a combination thereof. Reactant stream inlet (15) is positioned at a height corresponding to the first distillation zone (Z1). Reactant stream (A) may be fed into distillation column (1) at a rate of 4 to 22.2 kg-mole/hr relative to moles of silane produced per hour, such as a rate of 11 to 22 kg-mole/hr, or 11 to 16 kg-mole/hr.

In some embodiments, the pressure within the vessel is from 450 kPa to 1750 kPa. In certain embodiments, the pressure within the vessel is from 450 kPa to 650 kPa. The first distillation zone (Z1) is maintained at a temperature $T_1$, which is close to a boiling point of the reactant stream at a pressure within the vessel. In some embodiments, $T_1$ is 82° C. to 100° C. The second distillation zone (Z2) is maintained at a temperature $T_2$ at which liquid and/or vapor in the second distillation zone (Z2) has a halogen to silicon (X:Si) molar ratio between 2.8 and 3.2. In some examples, the ratio is 3. $T_2$ is adjusted depending upon the pressure in the vessel. In some embodiments, $T_2$ is from 60° C. to 150° C., such as 80° C. to 100° C.

A first distillate stream outlet (14) is provided and a pump (4) is used to transfer a first distillate stream (B) through a first catalytic redistribution reactor (6). Optionally, a side-stream cooler (5) may be placed between the first distillate stream outlet (14) and the pump (4) to cool distillate stream (B) to slightly below its bubble point temperature before it enters pump (4). The first catalytic redistribution reactor (6) includes a vessel defining a chamber, a first, or lower, port (8), a second, or upper, port (9) spaced apart from the first port (8), and a fixed-bed catalyst (7) disposed within the chamber between the first port (8) and the second port (9). The first port (8) is in communication with the first product flow inlet (3) of column (1). The first catalytic redistribution reactor (6) does not include a pressure equilibrium outlet or a vapor return outlet. The pump (4) provides a robust process that does not rely upon gravity to overcome flow resistance in the reactor (6). Redistribution reactor (6) may be operated at a pressure of 450 kPa to 650 kPa, and a temperature of 60° C. to 100° C.

The reactor product (C) containing a mixture of hydrohalosilanes with the same X:Si ratio as stream (B), but with less trihalosilane than stream (B) and substantially free of silane, $SiH_4$, is returned to multi-zone fractionation column (1) at a first product flow inlet (3) positioned between the reactant stream inlet (15) and the first distillate stream outlet (14). In some arrangements, the position of first product flow inlet (3) is selected to minimize the quantity of first distillate stream (B) flowing through first distillate stream outlet (14). In some embodiments, reactor product (C) has at least 5% less trihalosilane than stream (B), at least 10% less trihalosilane than stream (B), or at least 20% less trihalosilane than stream (B).

Vapor stream (E) is passed from an upper portion of column (1) to total condenser (28) to form a condensate comprising $H_zSiX_{4-z}$ where $z=y+1$. A condensate (F) containing a mixture of hydrohalosilanes substantially free of silane and silicon tetrahalide is withdrawn as a condensed liquid from the total condenser (28) and is fed by a pump (22) to a subsequent packed-bed catalytic redistribution reactor (23). Condensate (F) comprises $HzSiX_{4-z}$ where $z=y+1$. For example, if reactant stream (A) comprises $HSiX_3$, then condensate (F) comprises $H_2SiX_2$. In some embodiments, condensate (F) has a halogen to silicon molar ratio less than 2.0, such as from 1.5 to 2.0.

The subsequent catalytic redistribution reactor (23) does not include a pressure equilibrium outlet or a vapor return outlet. Redistribution reactor (23) may be operated at a pressure of 2000 kPa to 3500 kPa, and a temperature of 30° C. to 60° C. Second product flow (G) containing a mixture of hydrohalosilanes with the same X:Si ratio as the hydrohalosilanes of stream (F), but with a substantial amount of silane, $SiH_4$, from the second redistribution reactor (23) enters a second multi-zone fractional distillation column (16) at an inlet (24). For example, second product flow (G) may include 5 to 20% silane, such as 8 to 15% silane.

The second multi-zone fractional distillation column (16) includes a vessel defining a plurality of distillation zones, an inlet (24) operably coupled to the subsequent catalytic redistribution reactor (23), an outlet (19) positioned above inlet (24), a partial condenser (17) positioned above outlet (19), a purge stream outlet (18) positioned above partial condenser (17), and a bottom outlet (20). Inlet (24) is positioned at a height corresponding to a first distillation zone (Z3) located within column (16) wherein the distillation zone (Z3) has a temperature corresponding to a boiling point of the second product flow (G) at a pressure within the region. In some embodiments, the temperature is in a range from 0° C. to 50° C., such as from 5° C. to 35° C. at an operating pressure of 2000 kPa to 2500 kPa. Ultra-pure silane (H) is produced as a vapor or a condensed liquid product at outlet (19) positioned between inlet (24) and partial condenser (17). "Ultra-pure" means a purity of at least 99.995%, such as a purity of 99.995-99.9999%. A small purge stream (I) containing non-condensable gases (hydrogen, nitrogen, methane) boiling lower than silane along with a minor amount of silane, may be taken from purge stream outlet (18) above partial condenser (17). Stream (I) amounts to less than 10% of stream (H) and is used to purge low boiling point gases from the system. Even though stream (I) may be unsuitable for the most demanding electronic quality applications, it is sufficiently pure to be useful for production of silicon for solar cells or for other applications not requiring the highest purity silane.

The bottoms stream (D), containing a mixture of hydrohalosilanes (e.g., 10-20% monohalosilane, 40-50% dihalosilane, and 30-40% trihalosilane) and substantially free of silane, flows through pressure control device (21) to the first multi-zone fractional distillation column (1), and enters at inlet (25), which is positioned above first distillate stream outlet (14). Silicon tetrahalide (K) is delivered as a bottoms product from column (1) to be recycled to the hydrogenation zone, or is available for sale. Outlet (31) of column (1) provides an outlet for draining the column and/or removing non-volatile components.

The feed point, or inlet, (15) of reactant stream (A) to distillation column (1) is determined by the expected composition of the feed mixture and the separation profile of column (1). The higher the concentration of $HSiX_3$, the higher in the column would be the feed point. As previously described, the optimal feed point would be at the location where the column temperature is close to the boiling point of the reactant stream (A) at the column's operating pressure. In some embodiments, the feed point is at a location where the column temperature is within 50° C. of the feed reactant stream's boiling point, such as within 40° C., within 30° C., or within 20° C. In practical applications, several feed points are usually provided so that adjustments may be readily made depending upon the efficiency of the upstream process. Likewise, the location of the first distillate stream outlet (14) may be altered from one of several points along column (1).

Advantageously, the first distillate stream outlet (14) is positioned such that the distillate stream comprises at least some dihalosilane. In some arrangements, the distillate stream (B) may have a dihalosilane mole fraction of 0.01 to 0.15. The outlet location is at a point where the column composition of hydrohalosilanes has a X:Si molar ratio of between 2.8 and 3.2, such as between 2.8 and 3.1. In some embodiments, the X:Si molar ratio is 3. At this molar ratio, the catalytic redistribution reaction more efficiently prepares $H_2SiX_2$, and very little silane is produced. This, in turn, allows a total condenser (28) to operate efficiently at ordinary coolant temperatures (ambient air or typical cooling water).

The recycle stream (D) from the second distillation column (16) contains substantial amounts of halosilane ($H_3SiX$) and dihalosilane ($H_2SiX_2$), but is substantially free of silane, $SiH_4$. Stream (D) enters column (1) above the outlet (14) for first distillate stream (B), and thus prevents the X:Si ratio in first distillate stream (B) from falling below the target range of 2.8-3.2.

By selecting the operating pressure of first multi-zone fractional distillation column (1) to be from 450 to 1750 kPa, such as from 450 to 650 kPa, the temperature at the first distillate stream outlet (14) can be controlled to be between 60 and 150° C., such as between 60 and 90° C. This range is high enough for fast reaction kinetics and low enough to provide long operating life of the weak base macroreticular ion exchange resin, typically used as the catalyst. With a more thermally durable catalyst, a higher operating pressure and thus a higher side-draw temperature could be used. However, the X:Si ratio should remain in the range of 2.8-3.2 to prevent significant amounts of silane from being produced in this first reactor.

Figure 3:
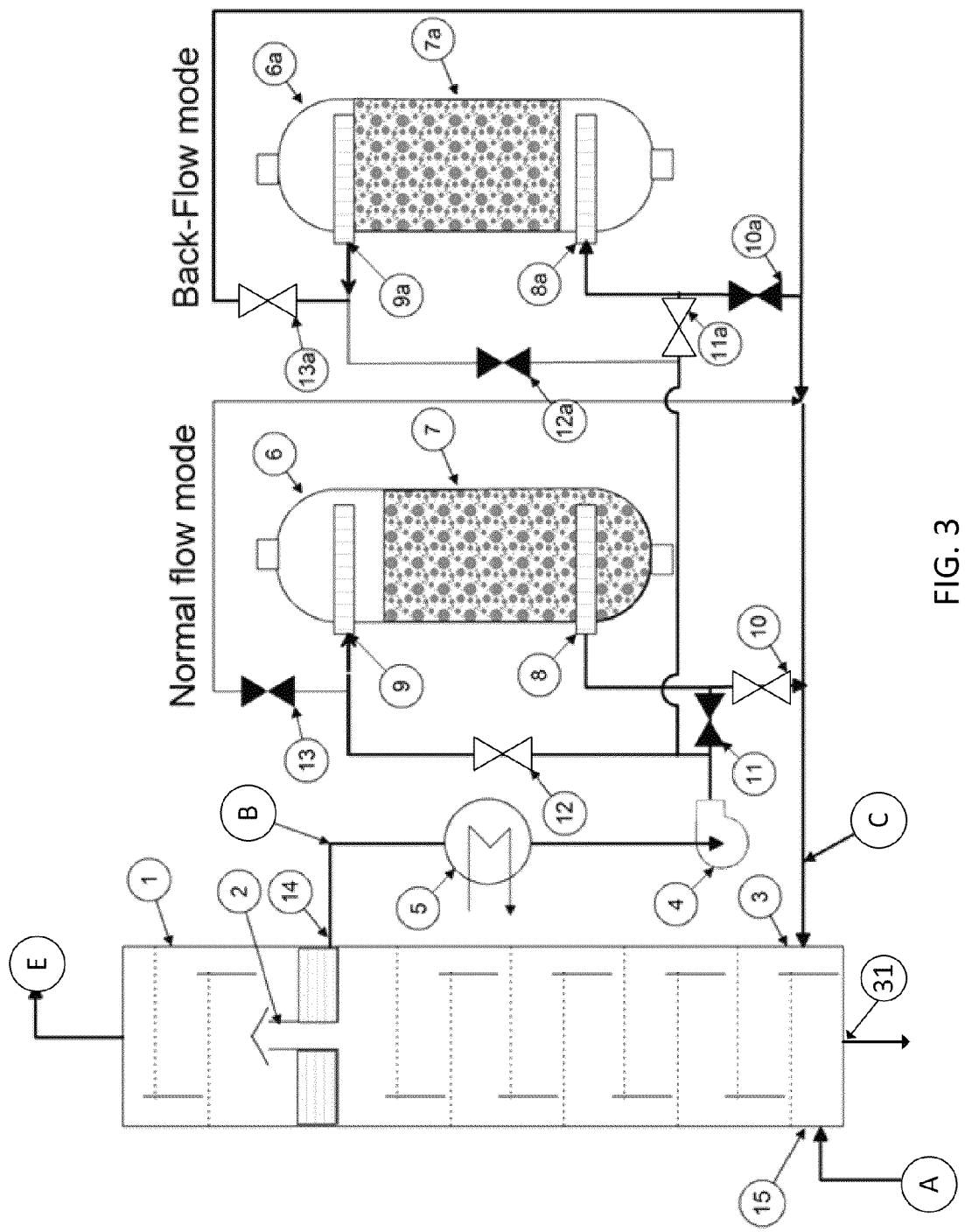
FIG. 3 is a schematic diagram illustrating another embodiment of an integrated distillation and catalytic redistribution system for the production of silane, including an exemplary arrangement for back-washing a catalytic redistribution reactor.

As previously discussed, a back-wash procedure is performed periodically when a pressure drop within the catalytic redistribution reactor exceeds a desired threshold. An exemplary arrangement for conducting a back wash/fluidization process during system operation is shown in FIG. 3.

A multi-zone distillation column (1) defines a plurality of distillation zones of either a packed bed or trayed configuration. In some embodiments, column (1) is provided with a chimney tray (2) which collects liquid distillate at a point toward the upper portion of the column (1). A reactant stream (A) comprising one or more hydrohalosilanes of formula $H_ySiX_{4-y}$, where X is a halogen and y is 1, 2, or 3, from Zone 1 (FIG. 1), whether produced by the hydrogenation of $SiX_4$ or produced by the hydrohalogenation reaction, enters the first multi-zone distillation column (1) at a reactant stream inlet (15). Vapor stream (E) is passed from an upper portion of column (1) to a condenser (not shown) to form a condensate comprising $H_zSiX_{4-z}$ where z=y+1. Outlet (31) of column (1) provides an outlet for draining the column and/or removing non-volatile components.

The liquid first distillate stream (B) is withdrawn through distillate stream outlet (14) and, optionally, flows down through a cooling device (5), such as a side-stream cooler, where the stream is cooled to slightly below its bubble point temperature before it enters circulation pump (4). When chimney tray (2) is present, distillate stream outlet (14) is fluidly connected to chimney tray (2). Circulation pump (4) provides sufficient pressure head to overcome the pressure drop in the redistribution reactor (6, 6a) and associated valves (10-13, 10a-13a) and piping plus the increased pressure where the product stream (C) re-enters the distillation column (1) at a point (i.e., product flow inlet (3)) lower in the column, which is at a higher pressure than at the withdrawal point (i.e., distillate stream outlet (14)).

Advantageously, the cooling device (5), when present, reduces the vapor pressure of the stream (B) and therefore provides a higher net positive suction head to the circulation pump (4). The circulation pump (4) is selected from either a canned-motor type or a magnetically-driven type, neither of which has rotating seals and is thus hermetically sealed. These types of pumps are commonly used in hydrochlorosilane service where they provide leak-free service under a wide variety of service conditions. One of the most important criteria for a long-term successful operation of these pumps is to have sufficient net positive suction head and/or liquid sub-cooling to prevent vaporization of the pumpage within the pump, which will result in poor lubrication of the internal bearings. The cooling device (5) is not required to control the temperature of the fluid (B) flowing to the reactor (6, 6a) as the operating pressure of column (1) and the liquid draw point (2) provide a very stable operating point which can be chosen at the time of the design. In some embodiments, by selecting the operating pressure of the multi-zone fractional distillation column (1) to be from 450 to 1750 kPa, advantageously from 450 to 650 kPa, the temperature of stream (B) at the distillate stream outlet (14) can be controlled to be between 60 and 150° C., advantageously between 60 and 90° C. This range is high enough for fast reaction kinetics and low enough to provide long operating life of the weak base macroreticular ion-exchange resin, typically used as the catalyst.

The catalytic redistribution reactor (6, 6a) may be configured in several ways including, but not limited to, multiple tubes containing the catalyst, one large bed, or multiple beds in parallel reactors. The product flow (C) exiting the catalytic redistribution reactor (6, 6a) contains a mixture of hydrohalosilanes with the same X:Si ratio as liquid stream (B), but with less trihalosilane than liquid stream (C) and substantially free of silane, $SiH_4$. For example, if the reactant stream (A) comprises trihalosilane, the product flow (C) exiting the catalytic redistribution reactor (6, 6a) comprises at least 5% less trihalosilane than liquid stream (B). In some embodiments, distillate outlet (14) is positioned such that liquid stream (B) has a X:Si molar ratio of between 2.8 and 3.2, such as between 2.8 and 3.1. In some embodiments, the X:Si molar ratio is 3. At this molar ratio, the catalytic redistribution reaction more efficiently prepares $H_2SiX_2$, and very little silane is produced.

Advantageously, back-washing the catalyst redistribution reactor is performed during system operation and uses only the source material, i.e., liquid stream (B). The back-wash method thus does not materially upset the operation of the distillation column (1), and does not interrupt the process.

The exemplary arrangement of catalytic redistribution reactors (6, 6a) shown in FIG. 3 allows for simultaneous normal flow through one reactor (6) while the other reactor (6a) is back-flushed. Reactor (6) includes a catalyst bed (7), a first, or lower, port (8), a second, or upper, port (9) that is located above the first port (8), and a plurality of valves (10-13). A first (lower) port outlet valve (10) is positioned between first port (8) and product flow inlet (3); a first port inlet valve (11) is positioned between pump (4) and first port (8); a second (upper) port inlet valve (12) is positioned between pump (4) and second port (9); a second port outlet valve (13) is positioned between second port (9) and product flow inlet (3). Reactor (6a) includes a catalyst bed (7a), a first, or lower, port (8a), a second, or upper, port (9a) that is located above the first port (8a), and a plurality of valves (10a-13a). A first (lower) port outlet valve (10a) is positioned between first port (8a) and product flow inlet (3); a first port inlet valve (11a) is positioned between pump (4) and first port (8a); a second (upper) port inlet valve (12a) is positioned between pump (4) and second port (9a); a second port outlet valve (13a) is positioned between second port (9a) and product flow inlet (3).

In a first configuration, valves (10), (12), (11a), and (13a) are open, and valves (11), (13), (10a), and (12a) are closed. Advantageously, the open valves are set so that a majority of stream (B) is pumped through valve (12) and into reactor (6) at upper port (9); product stream (C) exits reactor (6) at lower port (8), flows through valve (10), and returns to distillation column (1) through inlet (3). A minority of stream (B) is pumped through valve (11a) and into reactor (6a) through lower port (8a), thereby back-flushing reactor (6a). Product stream (C) exits reactor (6a) through upper port (9a), then flows through valve (13a) and returns to distillation column (1) through inlet (3). Distillate stream (B) is split between reactor (6) and reactor (6a). In some embodiments, at least 90% of liquid stream (B) flows into the reactor operating in normal-flow mode (reactor (6) in FIG. 3), with no more than 10% of liquid stream (B) flowing into the reactor operating in back-flow mode (reactor (6a) in FIG. 3). In some examples, at least 90%, advantageously 90-96%, of liquid stream (B) flows through the normal-flow reactor, with the remainder of the stream flowing into the back-flow reactor.

The pressure drop within reactors (6, 6a) is monitored. When the pressure drop within the reactor operating in normal-flow mode (i.e., reactor (6) in FIG. 3) exceeds a desired threshold, the flow patterns are reversed. In some embodiments, the threshold is a value selected within a range of 0.5 bar to 3.5 bar (50 kPa to 350 kPa). For example, the flow patterns may be reversed when the pressure drop exceeds 3 bar within the reactor operating in normal-flow mode. The upper end of the threshold range may be determined in part by mechanical limitations of the system hardware, including the pump strength. The lower limit of the range may be based on factors such as economic considerations and production logistics. Valves (11), (13), (10a), and (12a) are opened, and valves (10), (12), (11a), and (13a) are closed to reverse the flow pattern through the catalytic redistribution reactors. Reactor (6a) then operates in normal-flow mode with a majority of stream (B) entering through port (9a) and exiting through port (8a), while reactor (6) is back-flushed with a minority of stream (B) entering through port (8) and exiting through port (9). The system continues operating in this configuration until the pressure drop in reactor (6a) exceeds the desired threshold, at which time the flow patterns are once again reversed.

In one embodiment, both catalytic redistribution reactors (6, 6a) operate in normal mode until the pressure drop in one of the reactors exceeds the threshold, i.e., valves (10), (12), (10a) and (12a) are open, and valves (11), (13), (11a) and (13a) are closed. At such time, the flow to the affected reactor is reversed to back-wash that reactor. After the reactor has been back-washed with 2-4 bed volumes of reverse flow, the flow is once again reversed to normal mode.

In another embodiment, one catalytic redistribution reactor (6) operates in normal mode and the other catalytic redistribution reactor (6a) is held in reserve until needed. In other words, valves (10a), (11a), (12a), and (13a) are closed until the pressure drop in reactor (6) exceeds the threshold. At such time, the flow to reactor (6) is reversed, and normal flow through reactor (6a) is initiated by opening valves (10a) and (12a). After reactor (6) has been back-washed with 2-4 bed volumes of reverse flow, valves (10), (11), (12), and (13) are closed, and reactor (6) is held in reserve until the pressure drop in reactor (6a) exceeds the threshold. At that time, normal flow to reactor (6) is initiated, and reactor (6a) is back washed.

A person of ordinary skill in the art understands that, with reference to FIG. 2, a second catalytic redistribution reactor (not shown) can be installed in parallel with catalytic redistribution reactor (23) to facilitate back-washing of reactor (23) as needed.

Example

A process for the production of silane from a feed source containing trichlorosilane is processed in a system (FIG. 3) which includes a distillation column (1) and two packed bed redistribution reactors (6 and 6a) filled with DOWEX M-43 a macro-reticular weak base ion exchange resin. A chimney tray is provided at tray number 34 counting from bottom to top. Liquid removed from the chimney tray (2) flows down through a cooler (5) which cools the stream to 10° C. below the temperature at tray 34. The liquid enters a seal-less pump (4) which increases the pressure by 2.5 bar. The flow from the pump is split by control valves (10-13 and 10a-13a) to deliver 96% of the flow to reactor (6) and 4% to reactor (6a) in the normal mode of operation. When the pressure drop across reactor (6) increases to above 0.5 bar, the bulk of the flow is moved to reactor (6a) and the lower flow rate is routed to reactor (6) with the flow directions reversed in each reactor. Each reactor is sized to provide a normal-mode liquid flow rate equal to 20 m$^3$/hr superficial velocity and with a residence time of 6 minutes. In this manner, the total flow from and to the distillation column remains constant and the reactor beds are provided with reverse flow to redistribute the catalyst beads and flush out any very small particles which would hinder flow rates.

Additional disclosure concerning systems and reactive distillation methods for producing silane and hydrohalosilanes is found in U.S. application Ser. No. 13/328,820, filed Dec. 16, 2011, and PCT Application No. PCT/US2012/069758, filed Dec. 14, 2012, each of which is incorporated by reference herein in its entirety.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A system for producing silane and hydrohalosilanes, comprising:
    (a) a multi-zone fractional distillation column (1) comprising
        a vessel defining a plurality of distillation zones, having a reactant stream inlet (15) positioned in a lower portion of the column, a distillate stream outlet (14) positioned in an upper portion of the column, and a product stream inlet (3) positioned in a lower portion of the column;
    (b) a first catalytic redistribution reactor (6) comprising
        a vessel defining a chamber, the vessel having a first reactor lower port (8) positioned in a lower portion of the vessel and a first reactor upper port (9) positioned in an upper portion of the vessel,
        a fixed-bed catalyst disposed within the chamber between the first reactor lower port (8) and the first reactor upper port (9), and
        a plurality of valves (10), (11), (12), (13), wherein when valves (10) and (12) are open and valves (11) and (13) are closed, the first reactor lower port (8) is in fluid communication with the product stream inlet (3) and the first reactor upper port (9) is in fluid communication with the distillate stream outlet (14), and when valves (11) and (13) are open and valves (10) and (12) are closed, then the first reactor lower port (8) is in fluid communication with the distillate stream outlet (14) and the first reactor upper port (9) is in fluid communication with the product stream inlet (3);
    (c) a second catalytic redistribution reactor (6a) comprising
        a vessel defining a chamber, the vessel having a second reactor lower port (8a) positioned in a lower portion of the vessel, and a second reactor upper port (9a) positioned in an upper portion of the vessel,
        a fixed-bed catalyst disposed within the chamber between the second reactor lower port (8a) and the second reactor upper port (9a), and
        a plurality of valves (10a), (11a), (12a), (13a), wherein when valves (10a) and (12a) are open and valves (11a) and (13a) are closed, the second reactor lower port (8a) is in fluid communication with the product stream inlet (3) and the second reactor upper port (9a) is in fluid communication with the distillate stream outlet (14), and when valves (11a) and (13a) are open and valves (10a) and (12a) are closed, then the second reactor lower port (8*a*) is in fluid communication with the distillate stream outlet (14) and the second reactor upper port (9*a*) is in fluid communication with the product stream inlet (3); and (d) a pump (4) positioned downstream from the distillate stream outlet (14) and upstream from the first catalytic redistribution reactor (6) and the second catalytic redistribution reactor (6*a*).

2. The system of claim 1, further comprising a cooling device (5) positioned downstream of the distillate stream outlet (14).

3. The system of claim 1, wherein the valves (10), (12), (10*a*), and (12*a*) are configured to provide a greater flow rate of the distillate (B) than the valves (11), (13), (11*a*), and 13(*a*).

4. The system of claim 3, wherein the valves (10), (12), (10*a*), and (12*a*) are configured to provide a flow rate of the distillate (B) that is at least 9-fold greater than the flow rate through the valves (11), (13), (11*a*), and 13(*a*).

5. The system of claim 1, wherein the fixed-bed catalyst in the first catalytic redistribution reactor (6) and the second catalytic redistribution reactor (6*a*) is an ion-exchange resin.

6. The system of claim 5, wherein the ion-exchange resin comprises a plurality of particles differing in size.

7. A method for producing silane and hydrohalosilanes, comprising:
passing a reactant stream (A) comprising one or more hydrohalosilanes of formula $H_ySiX_{4-y}$ where X is a halogen and y is 1, 2, or 3 into a multi-zone fractional distillation column (1) comprising a vessel defining a plurality of distillation zones, wherein the reactant stream (A) is passed into the multi-zone fractional distillation column (1) through a reactant stream inlet (15) positioned in a lower portion of the column (1);
pumping a distillate (B) from the multi-zone fractional distillation column (1) via a distillate stream outlet (14) positioned in an upper portion of the column (1) through (i) a first catalytic redistribution reactor (6) comprising a vessel defining a chamber, a fixed-bed catalyst disposed within the chamber, a first reactor lower port (8) positioned in a lower portion of the first reactor, and a first reactor upper port (9) positioned in an upper portion of the first reactor (6), and (ii) a second catalytic redistribution reactor (6*a*) comprising a vessel defining a chamber, a fixed-bed catalyst disposed within the chamber, a second reactor lower port (8*a*) positioned in a lower portion of the second reactor (6*a*), and a second reactor upper port (9*a*) positioned in an upper portion of the second reactor (6*a*), thereby routing a first portion of the distillate (B) into the first catalytic redistribution reactor (6) via the first reactor upper port (9) and routing a first portion of a product stream (C) out of the first catalytic redistribution reactor (6) via the first reactor lower port (8), and further routing a second portion of the distillate (B) into the second catalytic redistribution reactor (6*a*) via the second reactor lower port (8*a*) and routing a second portion of the product stream (C) out of the second catalytic redistribution reactor (6*a*) via the second reactor upper port (9*a*), thereby back-flushing the second catalytic redistribution reactor (6*a*); and flowing the product stream (C) into the multi-zone fractional distillation column (1) via a product stream inlet (3) positioned in a lower portion of the multi-zone fractional distillation column (1).

8. The method of claim 7, wherein pumping the distillate comprises pumping the distillate to the first catalytic redistribution reactor (6) via the first reactor upper port (9) at a greater flow rate than a flow rate to the second catalytic redistribution reactor (6*a*) via the second reactor lower port (8*a*).

9. The method of claim 8, wherein the flow rate to the first catalytic redistribution reactor (6) is at least 9-fold greater than the flow rate to the second catalytic redistribution reactor (6*a*).

10. The method of claim 7, further comprising:
monitoring a pressure drop within the first catalytic redistribution reactor (6);
determining whether the pressure drop exceeds a threshold value; and
reversing a direction of flow through the first catalytic redistribution reactor (6) and the second catalytic redistribution reactor (6*a*) when the pressure drop exceeds the threshold value.

11. The method of claim 10, wherein reversing the direction of flow comprises:
routing a portion of the distillate (B) into the first catalytic redistribution reactor (6) via the first reactor lower port (8) and routing a portion of the product stream (C) out of the first catalytic redistribution reactor (6) via the first reactor upper port (9); and
routing a subsequent portion of the distillate (B) into the second catalytic redistribution reactor (6*a*) via the second reactor upper port (9*a*) and routing a subsequent portion of the product stream (C) out of the second catalytic redistribution reactor (6*a*) via the second reactor lower port (8*a*), thereby reversing the direction of flow through the first catalytic redistribution reactor (6) and the second catalytic redistribution reactor (6*a*).

12. The method of claim 11, wherein reversing the direction of flow further comprises pumping the distillate to the second catalytic redistribution reactor (6*a*) via the second reactor upper port (9*a*) at a greater flow rate than a flow rate to the first catalytic redistribution reactor (6) via the first reactor lower port (8).

13. The method of claim 10, further comprising:
monitoring a subsequent pressure drop within the second catalytic redistribution reactor (6*a*);
determining whether the subsequent pressure drop exceeds the threshold value; and
reversing the direction of flow through the first catalytic redistribution reactor (6) and the second catalytic redistribution reactor (6*a*) when the subsequent pressure drop exceeds the threshold value.

14. The method of claim 7, further comprising cooling the distillate (B) before pumping the distillate (B) through the first catalytic redistribution reactor (6) and the second catalytic redistribution reactor (6*a*).

\* \* \* \* \*